(12) United States Patent
Zorba Barah et al.

(10) Patent No.: US 8,310,980 B2
(45) Date of Patent: Nov. 13, 2012

(54) BEAMFORMING TECHNIQUE FOR BROADBAND SATELLITE COMMUNICATIONS

(75) Inventors: Nizar Zorba Barah, Castelldefels (ES); Marc Realp Campalans, Castelldefels (ES); Ana Isabel Perez-Neira, Castelldefels (ES)

(73) Assignee: Fundacio Privada Centre Tecnologic de Telecomunicacions de Catalunya, Castelldefels (Barcelona) (ES)

( * ) Notice: Subject to any disclaimer, the term of this patent is extended or adjusted under 35 U.S.C. 154(b) by 300 days.

(21) Appl. No.: 12/679,167

(22) PCT Filed: Oct. 15, 2007

(86) PCT No.: PCT/EP2007/060971
§ 371 (c)(1),
(2), (4) Date: Mar. 19, 2010

(87) PCT Pub. No.: WO2009/036814
PCT Pub. Date: Mar. 26, 2009

(65) Prior Publication Data
US 2010/0303002 A1    Dec. 2, 2010

(30) Foreign Application Priority Data

Sep. 21, 2007 (ES) .................................. 200702496

(51) Int. Cl.
*H04B 7/185* (2006.01)
(52) U.S. Cl. ............ 370/316; 455/7; 455/11.1; 455/12.1
(58) Field of Classification Search .................. 370/310, 370/315, 316; 455/7, 11.1, 12.1–13.4
See application file for complete search history.

(56) References Cited

U.S. PATENT DOCUMENTS

2004/0100941 A1    5/2004  Lim et al.
(Continued)

FOREIGN PATENT DOCUMENTS

WO    2007/084682    7/2007

OTHER PUBLICATIONS

International Search Report dated Jun. 4, 2008, from the corresponding International Application.

(Continued)

*Primary Examiner* — Charles C Jiang
(74) *Attorney, Agent, or Firm* — Katten Muchin Rosenman LLP

(57) ABSTRACT

Method for assigning a precoding beam forming scheme in a broadband satellite system, wherein said broadband satellite system comprises a multibeam satellite (1) having a plurality of antennas and a plurality of satellite beams, a gateway (2) and a number N of satellite terminals ($ST_{11}$, $ST_{12}$ ... $ST_{21}$, $ST_{22}$, $ST_{23}$ ... $ST_{K1}$, $ST_{K2}$ ...), and wherein said gateway (2) is configured for processing and serving a plurality of K beams of said plurality of satellite beams towards said number N of satellite terminals ($ST_{11}$, $ST_{12}$ ... $ST_{21}$, $ST_{22}$, $ST_{23}$ ... $ST_{K1}$, $ST_{K2}$ ...), wherein K<N, and wherein said assignation of a precoding beam forming scheme comprises a joint processing over said plurality of K beams. Said precoding beam forming scheme is dependent: on the radiation pattern of said satellite antennas; on the line of sight channel characteristics and on the multiuser diversity caused by said number N of satellite terminals ($ST_{11}$, $ST_{12}$ ... $ST_{21}$, $ST_{22}$, $ST_{23}$ ... $ST_{K1}$, $ST_{K2}$ ...). Gateway and satellite system. Computer program.

11 Claims, 3 Drawing Sheets

U.S. PATENT DOCUMENTS

2006/0222101 A1    10/2006   Cetiner et al.
2007/0153748 A1*    7/2007   Shapira .................... 370/338

OTHER PUBLICATIONS

L. Cottatellucci, et al. "Interference Mitigation Techniques for Broadband Satellite Systems" ICSSC 2006, 24th AIAA International Communications Satellite Conference, Jun. 11, 2006, pp. 1-13.

Konstantinos P. Liolis, et al. "Multi-Satellite MIMO Communications at Ku-Band and Above: Investigations on Spatial Multiplexing for Capacity Improvement and Selection Diversity for Interference Mitigation", Hindawi Publishing Corporation, EURASIP Journal on Wireless Communications and Networking, vol. 2007, May 13, 2007.

* cited by examiner

BEAMFORMING TECHNIQUE FOR BROADBAND SATELLITE COMMUNICATIONS

FIELD OF THE INVENTION

The present invention relates to broadband satellite communications and, more precisely, to beamforming techniques for broadband satellite communications.

STATE OF THE ART

For the last twenty years, investment in satellite communications has focussed on spreading the satellite signal to vast terrestrial areas, on reducing the price of satellite and receivers and on reducing interference. Typical satellite services do not suffer from substantial limitation of bitrate. However, nowadays there is a need of using advanced digital applications via satellite, which implies a need of increasing the bitrate capacity of the satellite channel. Possible proposals for exploiting the satellite channel are Adaptive Coding and Modulation (whose enclosure in the standard DVB-S2 is under discussion), MIMO, opportunistic scheduling or cooperative communications. Some of these proposals are introduced next.

The Multiple-Input-Multiple-Output (MIMO) Multiuser technology outstands as one of the major techniques to improve the performance of the wireless communications, being recently proposed for IEEE 802.11n, IEEE 802.16e and UMTS-HSDPA. This technology provides large data rate while using the same amount of spectrum and power, thanks to its spatial multiplexing capabilities.

There is an emerging interest in applying to satellite networks the good results obtained by MIMO techniques in terrestrial wireless systems.

As introduced by Konstantinos P. Lionis et al. in "Multi-Satellite MIMO Communications at Ku-Band and Above: Investigations on Spatial Multiplexing for Capacity Improvement and Selection Diversity for Interference Mitigation", Hindawi Publishing Corporation, EURASIP Journal on Wireless Communications and Networking, Volume 2007, one of the fundamental problems in satellite systems for the applicability of Multiple Input Multiple Output (MIMO) techniques relates to the difficulty for generating completely independent fading profiles at the space segment. Placing multiple antennas in a single satellite does not seem a valid option in order to exploit the capabilities of the MIMO channel. Indeed, the absence of scatters in the vicinity of the satellite leads to an inherent rank deficiency of the MIMO channel matrix. In other words, due to the strong Line of Sight (LOS), the MIMO satellite channel matrix has a rank near to one.

Therefore, it seems that the MIMO techniques application to the satellite communication segment is unprofitable; a matter that explains the almost nonexistent literature on MIMO for satellite communications.

On the other hand, several proposals have considered the use of channel knowledge in order to select the best satellite beam in satellite communications. For example, the patent application US2004/0100941 discloses an adaptive packet transmission method in a cellular mobile communication system using a multi-beam satellite, wherein a selection of the best satellite beam is done. However, in this method, the system spatial multiplexing capabilities are not extracted.

The MIMO application requires for more than one path to make the information reach a Satellite Terminal (ST) on the Earth. However, current commercial systems are targeted to create a single communication path to deliver the information to each ST, making use of frequency planning and/or sharper satellite beams, to avoid interference among the serviced STs. Hence, through a different philosophy for transmission, an alternative scenario is obtained when the frequency reuse is reduced to one and information to one satellite terminal is delivered through multiple satellite beams simultaneously.

In that case, due to partial overlap of the satellite beams, a ST may receive signals from several satellite beams. Therefore, MIMO channels can be obtained if a joint processing is carried over all the beams. L. Cottatellucci, et. al., in "Interference mitigation techniques for broadband satellite system," 24th *AIAA International Communications Satellite Systems Conference*, San Diego-USA, June 2006, has tackled the problem of joint processing over the multi-beam signals at a gateway, exploiting the spatial multiplexing which is made possible by the assumed multi-beam satellite coverage. It is proposed to use a linear precoding technique based on the Minimum Mean Square Error (MMSE) for increasing the potential system capacity on the Forward Link (FL). This linear precoding technique involves a random selection of users (satellite terminals). More precisely, this technique randomly selects a user per beam. For the operation of this scheme, full channel knowledge (modulo+phase) is required. Since full knowledge of the channel seen by all the users is impracticable, a random selection of users is implemented. Once this random selection of users is done, a Minimum Mean Square Error (MMSE) precoding technique is applied.

However, applying a random selection fails to get the most of the system capabilities, since in many situations, the randomly selected user is not the best one, but simply the one which has randomly been chosen. This implies a non-efficient use of the system resources, to compensate for the possibly not so good characteristics of the channel due to the random selection process.

SUMMARY OF THE INVENTION

The present invention aims to solve the above-mentioned problems by means of a method of assigning precoding gain which optimizes the satellite scenario characteristics and multiuser diversity, providing a high system performance while requiring a low complexity design. The current method applies MIMO techniques to the user segment of the forward link (FL) in a satellite system under the control of a single terrestrial gateway. A scheduler in the gateway runs a multi-beam opportunistic beamforming (MOB) technique, wherein the satellite antennas radiation pattern, the channel Line of Sight (LOS) information and the multiuser diversity are incorporated in the design process of the precoder.

The large number of available users or STs in a satellite scenario allows the possibility of obtaining a multi-user gain (through the application of the MIMO multi-user transmission techniques). The Multibeam Opportunistic Beamforming scheme presents several advantages, such as its low complexity design, high system performance, users selection process and its application not only in systems with full channel knowledge, but also to systems with partial channel knowledge.

It is a primary aim of the present invention to provide a method for assigning a precoding beam forming scheme in a broadband satellite system, wherein the broadband satellite system comprises a multibeam satellite having a plurality of antennas and a plurality of satellite beams, a gateway and a number N of satellite terminals, and wherein the gateway is configured for processing and serving a plurality of K beams of that plurality of satellite beams towards that number N of satellite terminals, wherein K<N, and wherein that assignation of a precoding beam forming scheme comprises a joint processing over that plurality of K beams. That precoding beam forming scheme is dependent: on the radiation pattern of the satellite antennas; on the line of sight channel characteristics and on the multiuser diversity caused by that number N of satellite terminals.

In particular, that dependence of the precoding beam forming scheme on the multiuser diversity comprises a selection of K satellite terminals among that number N of satellite terminals, wherein K<N, that selected K satellite terminals having best signal-to-noise ratio or signal-to-noise-interference-ratio.

That selection of K satellite terminals is carried out according to the following steps: dividing the area in which the number N of satellite terminals is located into a number K of cells, each of them comprising at least one satellite terminal; at each cell, selecting one satellite terminal corresponding to a best value of signal-to-noise ratio or signal-to-noise-interference-ratio.

That joint processing and selection of K satellite terminals over the plurality of K beams is carried out following the steps of: generating a first precoding vector and transmitting it towards a first cell from the satellite, wherein that first precoding vector is built from the information of the radiation pattern of the satellite antennas, that precoding vector being a vector K×1 and comprising the contribution of each of the K beams over that first cell; feeding back to the satellite a signal-to-noise ratio measured by each of the satellite terminals in the cell; at the satellite side, selecting a satellite terminal within said cell having best signal-to-noise ratio and requesting said selected satellite terminal to send its channel characteristics; building subsequent precoding vectors, selecting satellite terminals having best signal-to-noise-interference ratio within corresponding cells and requesting each of said selected satellite terminals to send its channel characteristics, each subsequent precoding vector being dependent on the information of the radiation pattern of said satellite antennas and on the channel characteristics of the previously selected satellite terminals, said precoding vector being a vector K×1 and comprising the contribution of each of said K beams over a corresponding cell; building a precoding matrix having size K×K, wherein the K columns of said precoding matrix are the K precoding vectors previously built.

That first precoding vector is the result of normalising in power a first vector which comprises K power contributions corresponding to said satellite beams towards said cell, and wherein said subsequent precoding vectors are the result of normalising in power a corresponding vector which comprises K power contributions corresponding to K satellite beams towards a cell.

That subsequent precoding vector is dependent on a blocking matrix having size K×p.

The channel characteristics comprise both amplitude and phase information.

Alternatively, the joint processing over said plurality of K beams is carried out following the steps of: building a first precoding vector, wherein said first precoding vector is built from the information of the radiation pattern of said satellite antennas, said precoding vector being a vector K×1 and said precoding vector comprising the contribution of each of said K beams over said first cell; building K−1 subsequent precoding vectors, each of them having size K×1, each subsequent precoding vector being dependent on the information of the radiation pattern of said satellite antennas and on the precoding vectors previously built and said precoding vector comprising the contribution of each of said K beams over a corresponding cell; building a precoding matrix having size K×K, wherein the K columns of said precoding matrix are the K precoding vectors previously built.

That subsequent precoding vector is dependent on a blocking matrix.

This method further comprises: transmitting said precoding matrix towards said area; at each cell, feeding back to said satellite a signal-to-noise-interference ratio measured by each of the satellite terminals in said cell; selecting one satellite terminal per cell, said selected satellite terminals having best signal-to-noise-interference ratio within corresponding cells.

Furthermore, the present invention provides a method of simultaneous transmission of data to K satellite terminals in a broadband satellite system, said broadband satellite system comprising a satellite and a number N of satellite terminals wherein, prior to starting said simultaneous transmission of data to K satellite terminals, the method comprises the step of: assigning a precoding beam forming scheme and selecting a group of K satellite terminals according to the method previously described.

It is another object of the present invention to provide a gateway comprising means adapted for carrying out the steps of the previous method.

Finally, it is a further object of the present invention to provide a computer program comprising computer program code means adapted to perform the steps of the mentioned method when the program is run on a computer, a digital signal processor, a field-programmable gate array, an application-specific integrated circuit, a micro-processor, a microcontroller, or any other form of programmable hardware.

The advantages of the proposed invention will become apparent in the description that follows.

BRIEF DESCRIPTION OF THE DRAWINGS

To complete the description and in order to provide for a better understanding of the invention, a set of drawings is provided. Said drawings form an integral part of the description and illustrate a preferred embodiment of the invention, which should not be interpreted as restricting the scope of the invention, but just as an example of how the invention can be embodied. The drawings comprise the following figures.

DESCRIPTION OF PREFERRED
EMBODIMENTS OF THE INVENTION

Definitions

In the context of the present invention, the following definitions should be considered:

The expression "forward link" refers to a communications relay satellite link from a fixed location (e.g., a gateway) to a user. Such a link comprises both an uplink (gateway to satellite) and a downlink (satellite to user). The general term "user" refers to both mobile users (such as mobile terminals) and fixed ones (such as a satellite terminal).

Figure 1:
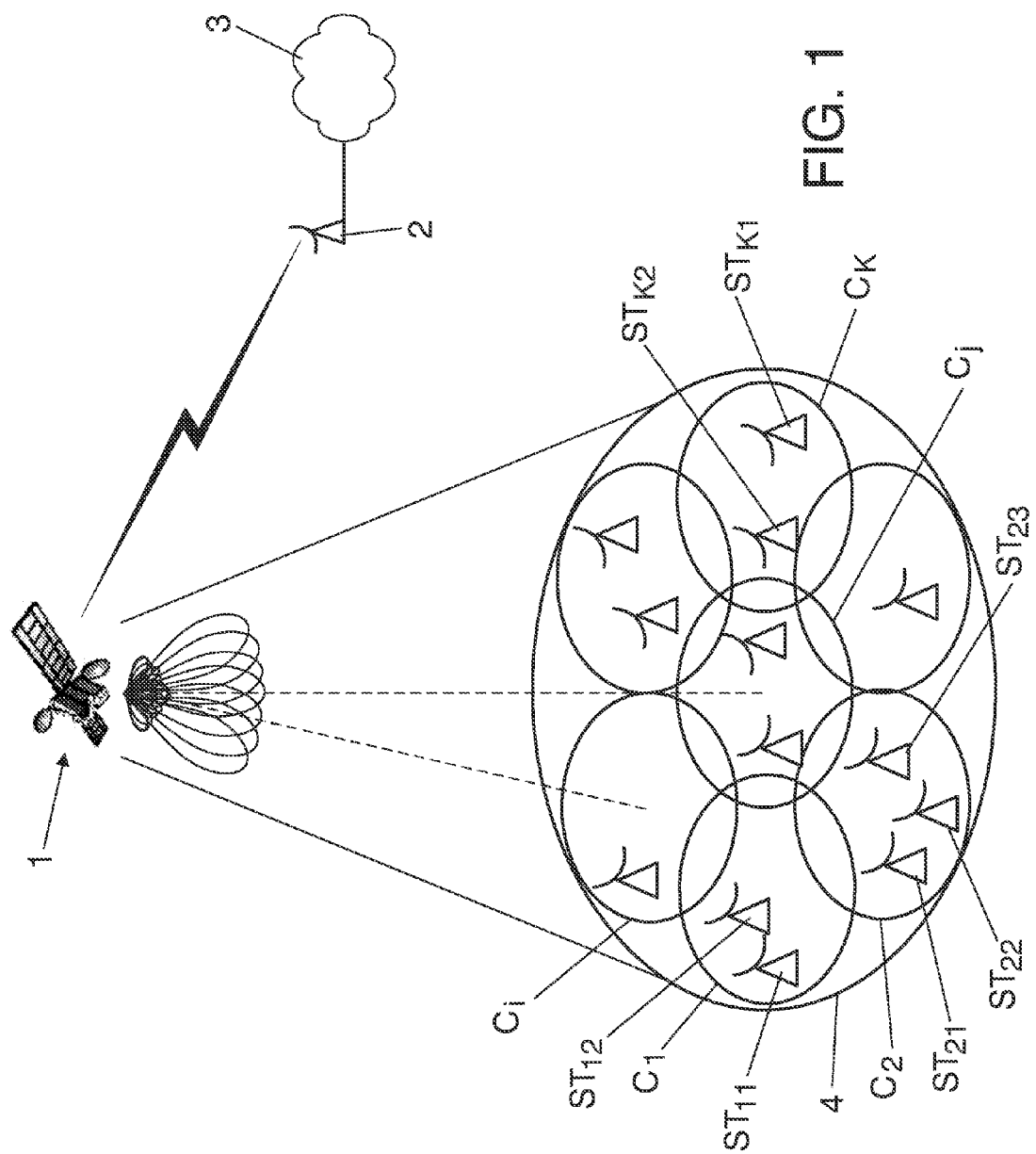
FIG. 1 shows a satellite system according to an embodiment of the present invention.

The expression "satellite terminal" refers to the terrestrial terminals, place on the Earth, which communicate with a certain satellite. FIG. 1 shows a plurality of satellite terminals $ST_1$ $ST_2$ ..., served by satellite 1. In the context of the present invention, we refer to "users" as a synonym of "satellite terminals".

The term "MIMO" in expressions such as "MIMO satellite scenarios", "MIMO precoding" or "MIMO processing" refers to situations in which a plurality of input signals and a plurality of output signals is considered in order to carry out a certain activity, such as precoding or processing. These multiple inputs and multiple outputs relate to multiple satellite beams focussed to multiple satellite terminals or to multiple cells.

The term "transmission" and its derivates (to transmit ... ), referred to a precoding vector or to a precoding matrix, should be interpreted as the joint transmission of such a vector or matrix and a data vector.

In this text, the term "comprises" and its derivations (such as "comprising", etc.) should not be understood in an excluding sense, that is, these terms should not be interpreted as excluding the possibility that what is described and defined may include further elements, steps, etc.)

Finally, the operator $(\square)^H$ denotes hermitian transposition of a matrix.

DESCRIPTION OF THE PREFERRED EMBODIMENTS

FIG. 1 is a schematic representation of a forward link between a gateway, a bent pipe satellite and a plurality of satellite terminals on the Earth. FIG. 1 shows a satellite 1, a plurality of satellite terminals $ST_{11}$, $ST_{12}$ ... $ST_{21}$, $ST_{22}$, $ST_{23}$ ... $ST_{K1}$, $ST_{K2}$ ... located on the Earth, and a gateway 2. The total number of satellite terminals is N. The gateway 2, which is a control station placed on the Earth, is in charge of the processing, coding, scheduling, etc. of the satellite signals. The satellite 1, located in the space, receives a signal sent by the gateway 2 and sends it towards the Earth (towards the satellite terminals). In other words, the satellite 1 acts as repeater. Thus, the system intelligence remains at the gateway 2. The gateway 2 is connected to a terrestrial network 3. This satellite-gateway configuration corresponds to current technological limitations, in the sense that current satellites act mostly as repeaters, while the processing capacity lies at a gateway. However, the skilled person shall understand that this configuration may evolve to situations wherein the satellite comprises part or all the system intelligence. This variation is obviously comprised within the scope of the invention.

In a satellite communications process, several independent information beams are physically generated at the satellite to deliver service to several geographical locations on the Earth. Usually, a single satellite is controlled by several gateways, each of them controlling a group of those information beams. As a matter of example, a satellite can commercially generate and carry up to 106 satellite beams at the same time, while each gateway is usually designed to control the information of about 7 satellite beams. Thus, a gateway can be designed to manage the satellite information transmitted over a certain area.

In FIG. 1, K satellite beams are generated to cover a certain area 4. These K beams are controlled by a single terrestrial gateway 2.

In a preferred embodiment, area 4 is divided into M cells $C_1, C_2, \ldots, C_M$, each of them comprising one or more satellite terminals $ST_{11}$, $ST_{12}$ ... $ST_{21}$, $ST_{22}$, $ST_{23}$ ... $ST_{M1}$, $ST_{M2}$ ... As already said, there are in total N satellite terminals. The number of cells M is equal or greater than the number of satellite beams K ($M \geq K$). Preferably, M=K, which means that the system provides one satellite beam for each cell $C_i$. Alternatively, M>K, in which situation the system temporally disable a number M−K cells, in order to have the same number of satellite beams as enabled cells.

In an alternative embodiment, area 4 is formed by a single cell comprising the whole amount of N satellite terminals $ST_{11}, ST_{12} \ldots ST_{21}, ST_{22}, ST_{23} \ldots ST_{K1}, ST_{K2} \ldots$. The whole cell is served by K satellite beams.

For the sake of simplicity, the description which follows considers K satellite beams directed toward an area 4 which is divided into M cells, wherein M=K.

In order to carry out the method of the invention, a MIMO satellite scenario needs to be defined. This is represented in FIG. 1. Once this scenario is defined, a gain precoding scheme needs to be established. This gain precoding scheme is dependent on the multiuser diversity caused by the N satellite terminals. It has to be noted that the requirement of low complexity transmission techniques for their application in commercial systems restricts the choice of said precoding scheme to low complexity ones.

The joint processing of the method of the invention is also dependent on the channel characteristics. It is remarked that, while the processing disclosed by L. Cottatellucci, et. al. (see the referral in the "State of the Art") takes the channel into consideration, it does not exploit its specific characteristics. Its scheme is the same as that of terrestrial communications, without specific considerations to satellite systems.

Figure 2:
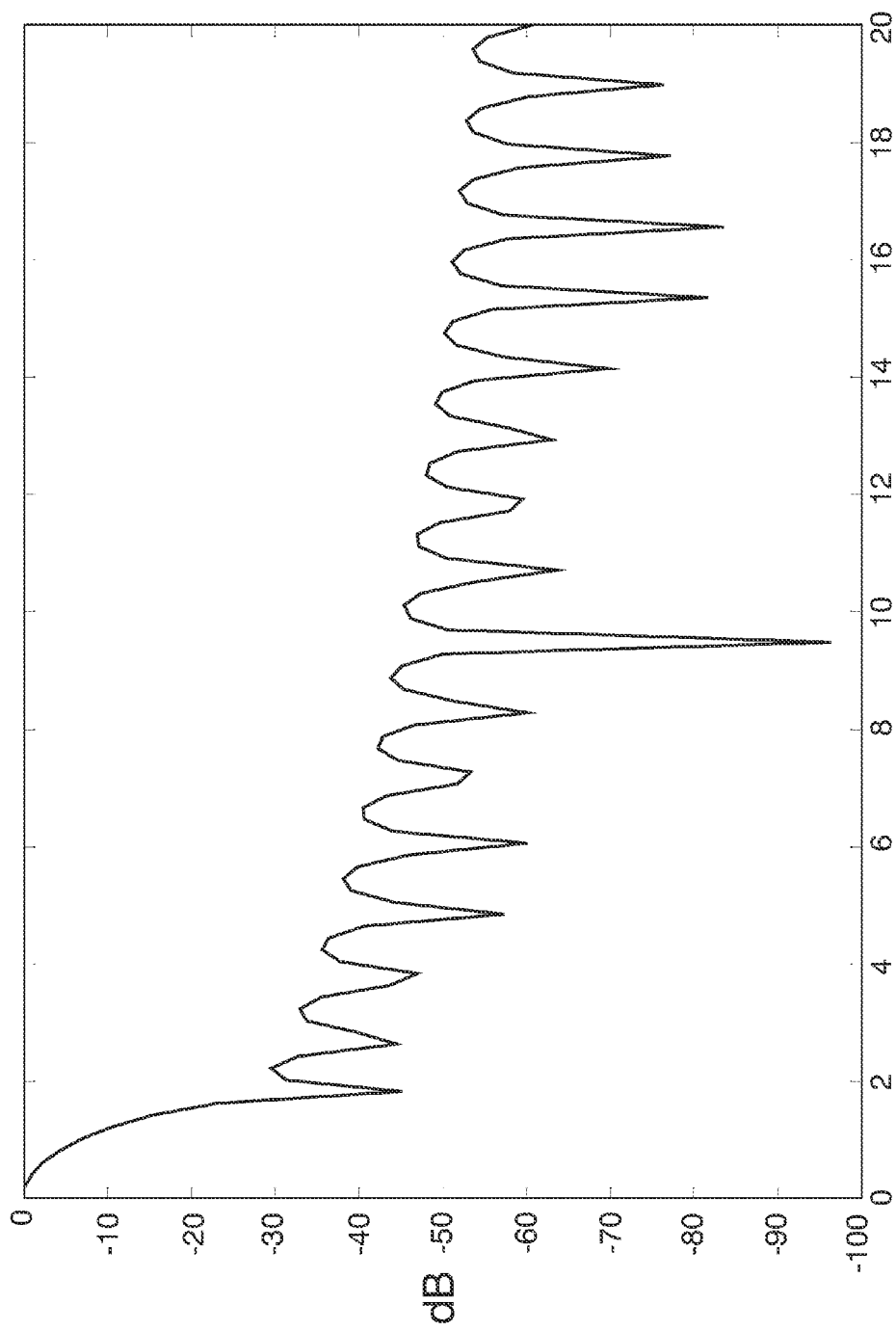
FIG. 2 shows a radiation pattern of the satellite antennas according to the present invention.

The characteristics of the satellite channel are dependent on the line of sight (LOS). The coverage area of a satellite beam is related to the radiation pattern of the satellite antennas used to generate such a satellite beam. In the present invention, a single receiving antenna per satellite terminal is considered, as having more than one antenna per satellite terminal is not beneficial to the system (i.e. they are undistinguishable and thus seen as a single receiving antenna). FIG. 2 exhibits an example of the radiation pattern corresponding to a single beam at the satellite 1. The horizontal axis (X-axis) represents the angle of radiation θ (in degrees °) and the vertical axis (Y-axis) represents the attenuation (dB). The radiated power is normalised to 1 Watt, and therefore at the centre of the beam (zero angle (0°)) the power is 0 dB.

A similar radiation pattern is applied to each satellite beam. However, the radiated power from a beam i is also received at all the K−1 other cells $C_1, C_2, \ldots, C_{i-1}, C_{i+1}, \ldots C_K$ of area 4, with a power level that corresponds to the relative position of the cells. At the gateway 2, the satellite antennas radiation patterns are known and therefore, the radiated power level from each satellite beam towards the physical locations on Earth can be computed.

Figure 3:
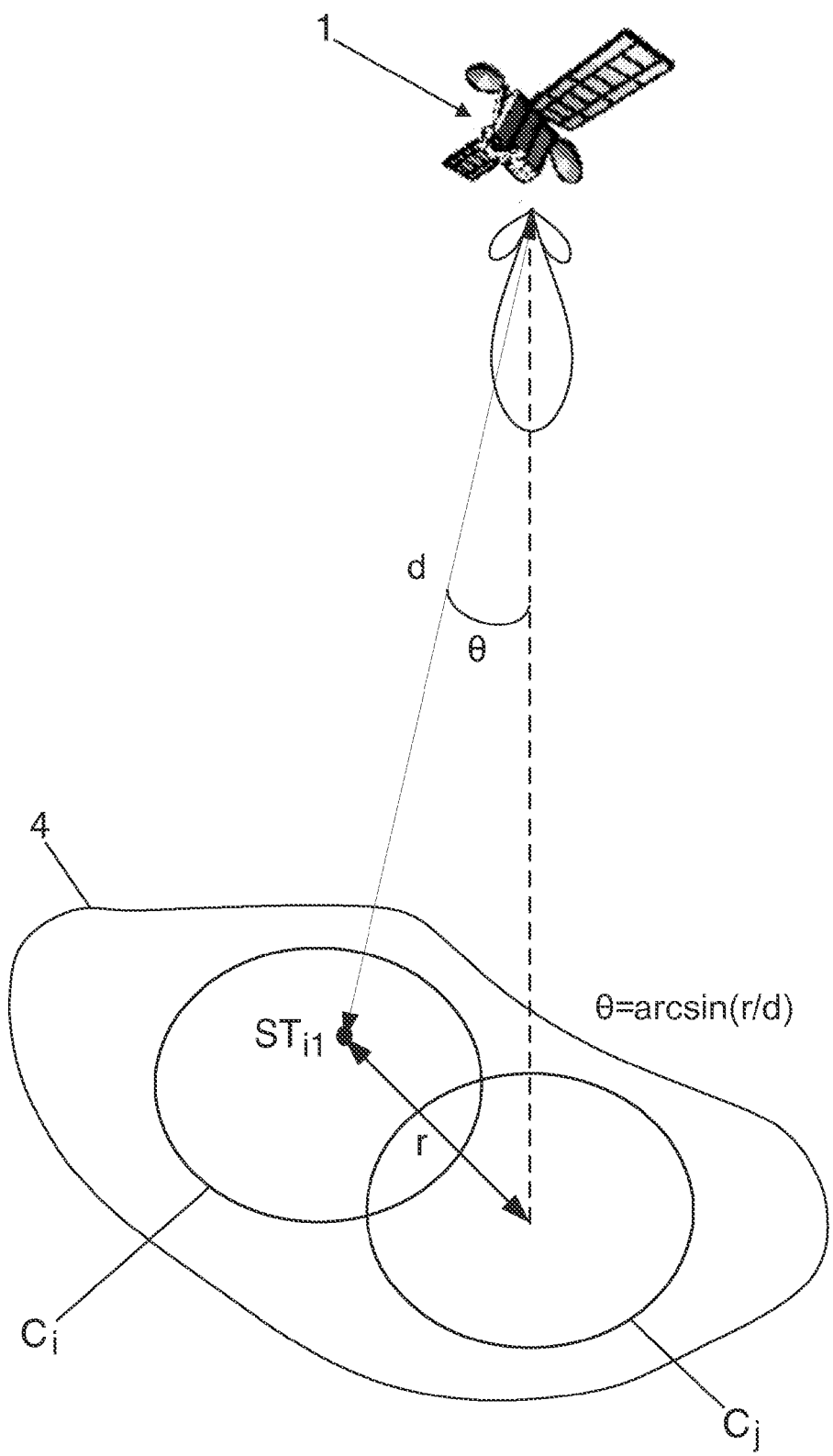
FIG. 3 shows a scheme representing a computation of a radiation angle according to the present invention.

The value of the radiated power level from a satellite beam at a certain location on the Earth is illustrated in FIG. 3. It is obtained by first computing the radiation angle θ at which a ground location (for example, satellite terminal $ST_{i1}$) is illuminated by a beam. FIG. 3 relates to the trigonometric relationship between a ground location (satellite terminal $ST_{i1}$, located within cell $C_i$) and the beam radiation angle θ (from a beam focussed towards cell $C_j$). The influence of that beam on other locations in other cells can be trigonometrically deducted as follows: θ=arcsin(r/d), wherein "d" is the distance from the satellite 1 to location $ST_{i1}$, "r" is the distance from said location $ST_{i1}$ to the location to which that beam is focussed and θ is the radiation angle. This radiation angle θ is illustrated in FIG. 2. The criteria followed for choosing the precise point in cell $C_i$ at which that beam is focussed is out of the scope of the present invention. It is up to the system provider or designer. Therefore, with the calculated radiation angle θ and the antennas radiation pattern (which is known) corresponding to that radiation angle θ, it is possible to know the radiated power level from each satellite beam at each ground location $ST_{ct}$ (wherein "c" indicates the cell and "t" indicates the satellite terminal within cell "c"). Thus, the radiated power level information is obtained at the gateway 2 without any training transmission process.

The satellite beams are designed according to a predefined radiation function. Non-limiting examples of radiation functions are the Bessel functions. One of these Bessel functions is shown in FIG. 2. According to this predefined radiation function, the gateway 2 knows in advance the radiation pattern. For example, as illustrated in FIG. 2, if a power of 1 Watt is injected to a beam, then a power of 0 dB is emitted at the zero angle (0°). Similarly, said injected power of 0 dB implies a power of about –45 dB at the angle equal to 10°.

Thus, it is possible to calculate the influence (in terms of power) that a beam emitted towards a point within a cell $C_i$ has on any point within a different cell $C_j$. This is due to the fact that the characteristics of the satellite channel allow the signals to travel without signal reflections and multipath, or in other words, with Line of Sight (LOS). Under these conditions, it is possible to pre-calculate the power which arrives at a certain destination (taking into account, of course, other parameters, such as path loss, receiver efficiency, etc.). This does not happen in terrestrial systems due to signal reflections and multipath. On the other hand, a satellite terminal has the same channel characteristics with respect to all different satellite beams; only the received power level varies from beam to beam. In other words, the large distance (in the order of several thousands of Km) between a satellite and a satellite terminal makes the channel characteristics seen from a certain location or satellite terminal $ST_{ct}$ to all the satellite beams be the same.

Using the proposed trigonometric algorithm, the received power at a ground location from each of the satellite beams can be determined. Therefore, generating precoding vectors in such a way that they exploit the information regarding to the antennas radiation pattern is of great help to increase the system performance. This is not guaranteed if conventional terrestrial systems are used, where precoding vectors are not only randomly generated, but also they do not take into account the line of sight channel characteristics nor the radiation pattern of the antennas.

The present invention takes advantage of the above-mentioned channel characterisation (Line of Sight), in order to carry out a precoding or preprocessing which takes into account the signal contribution from each of the beams. The bitrate is thus increased. Furthermore, the present invention combines this information (channel characterisation) with the multiuser diversity for designing a Multibeam Opportunistic Beamforming technique that extracts the scenario multiuser gain.

The precoder generation of the present invention provides a low complexity design and implementation. As a random precoding generation is not a proper approach in order to extract all the benefits from the MIMO processing, by exploiting the characteristics of the satellite communication scenario, the precoding generation can benefit from the Line of Sight (LOS) channel condition. Therefore, the selection of satellite terminals is designed to be opportunistic.

Going back to FIG. 1, a plurality of N satellite terminals is served by gateway 2 via satellite 1. A set of K beams is available. The selection of the satellite terminal to be served in each cell is determined by a scheduler at the gateway 2. As already mentioned, area 4 is divided into K cells, each of them having one or more satellite terminals.

Each satellite terminal in area 4 receives a signal component from each one of the K beams. The received signal at each satellite terminal is thus the sum of the K received signals and can be expressed as follows:

$$y = h_i Fs + z$$

wherein:
$s = (s_1, \ldots, s_K)^T$ is a K×1 transmitted symbol vector;
y is a scalar quantity representing the sum of the K received signals at a satellite terminal;
z is the received noise;
$h_i$ is the 1×K channel of the $i^{th}$ satellite terminal, where each entry corresponds to the channel seen from the $i^{th}$ satellite terminal with respect to each one of the beams, showing same channel characteristics but with different received power levels. Note that obtaining the channel information $h_i$ is out of the scope of the present invention; and
F is the K×K precoding matrix that is in charge of the MIMO processing simultaneously carried over all the beams. The present invention provides a method for obtaining this precoding matrix. Therefore, F determines how the different components of the data vector s are combined over the beams in order to optimize transmission. Each column of the F matrix represents the MIMO processing carried over each satellite beam.

As already said, obtaining the channel information $h_i$ is out of the scope of the present invention.

Next, two different situations are distinguished, because the information that is available at the transmitter side (i.e. the gateway) can be either partial or full in terms of Channel State Information (CSI) received from each satellite terminal. Note that full CSI for all the N users is impractical (in fact, this motivated the random user selection and MMSE precoding in Cottatellucci). Therefore, a lower amount of CSI is required for practical systems. Partial CSI is an attractive approach. When partial CSI is available, then the precoding vectors are orthogonally generated to decrease the received interference at each ST. Another option is to have full CSI from only the selected users (this selection will be explained in detail in "Situation A"): When full CSI is present, the transmitter (gateway) carries out some processing, to provide a triangular interference cancellation among the serviced satellite terminals. From now on, "full" CSI is to be interpreted as full CSI from only the selected users or satellite terminals.

Having full or partial CSI depends on the system setup and on the available load in the feedback channel. If little feedback is allowed, then only the SNIR is fed back (partial channel information), while if more feedback is allowed, then a full channel feedback of the selected satellite terminals is enabled.

Situation A—Method for Precoding when Full Channel State Information at Transmitter Side In this case, only one satellite terminal per beam is served at each time instant.

First, a first vector $b_1$ is desired to point towards a cell $C_1$ included in area 4. Such point is chosen in accordance with the radiation pattern known by the scheduler of the gateway 2 (explained with reference to FIGS. 2 and 3). The Spatial Power Density (SPD) or received power level received in all the satellite terminals of cell $C_1$ from each one of the K beams is known to the gateway 2, through the calculation proposed with relation to FIG. 3. Therefore, the gateway 2 knows in advance the average power (in modulo) that a satellite terminal located in cell $C_1$ receives from each one of the K beams. However, the phase received from each beam is unknown. Thus, a first precoding vector is generated to be transmitted towards cell $C_1$. $b_1$ is a vector having size K×1. The modulo of each of the K elements of this vector $b_1$ is directly taken from the SPD, applying the already mentioned formula $\theta=\arcsin(r/d)$, while the phase of each element is randomly generated. It is normalized in power and transmitted as $f_1$. Thus, $f_1$ is a vector having size K×1.

Then, all satellite terminals in area 4 detect precoding vector $f_1$ and measure the received power (modulo) from it.

Next, each one of the plurality of satellite terminals $ST_{11}$, $ST_{12}$ . . . in cell $C_1$ feeds back to the scheduler of the gateway 2 its received SNR (signal-to-noise ratio) $SNR_{11}$, $SNR_{12}$ . . . .

This first precoding vector $f_1$ forms the first column of precoding matrix F.

The scheduler at the gateway 2 selects the satellite terminal ($ST_{11}$ or $ST_{12}$, if the cell has only two satellite terminals, as exampled by FIG. 1) within cell $C_1$ with best fed back SNR value. Since the system allows for full CSI information from the selected users through the feedback link, the gateway 2 asks the selected satellite terminal to feed back its whole channel (amplitude and phase) $h_{sel(1)}$. Note that each satellite terminal gets to know its full channel information during a standard training stage, which is out of the scope of this invention. $h_{sel(1)}$ is a vector 1×K, each of which elements comprise modulo and phase.

For the generation of the remaining precoding vectors $f_2$ $f_3$, . . . the goal is to reduce as much as possible the interference between beams. A blocking matrix is designed for such a target.

Next, a second transmitting precoding vector $f_2$ is now required. $f_2$ is desired to precode data to be transmitted towards a second cell $C_2$ included in area 4. $f_2$ is developed in a similar way as that of precoding vector $f_1$: The SPD received in cell $C_2$ from each one of the K beams is also known, as previously explained. Again, we start from an initial vector $b_2$. Like $b_1$, $b_2$ is a vector having size K×1. The modulo of each of the K elements of this vector $b_2$ is directly taken from the SPD, as already explained, while the phase of each element is randomly generated.

For the design of column $f_2$, a blocking matrix $D_2$ having dimension K×2 is designed. Blocking matrix $D_2$ has a first column corresponding to vector $b_2$ and a second column corresponding to a vector $h^H_{sel(1)}$:

$$D_2=[b_2 h_{sel(1)}^H]$$

where $h_{sel(1)}$ represents the whole channel (amplitude and phase) of the selected satellite terminal of cell $C_1$.

Once matrix $D_2$ is obtained, a power normalized transmitting precoding vector $f_2$ is generated by using the blocking matrix as $$f_2=D_2[D_2^H D_2]^{-1}1$$

where 1 is a vector of all zeros except the position that corresponds to the number "p" of a corresponding cell $C_p$ (in this case, p=2). $f_2$ is a normalised vector of K×1.

In this case, the precoding vector $f_2$ is orthogonal to the channel of the satellite terminal in cell $C_1$. Then, the interference to the selected satellite terminal in cell $C_1$ is zero. Since the design is sequential, the selected user in $C_1$ receives zero interference from $f_2$, but not the other way round. This is called triangular cancellation of interference.

Thus, the selected satellite terminal in the area of cell $C_1$ avoids interference from the sequentially generated beams after its own beam (i.e. beams towards $C_2$ $C_3$ $C_4$ . . . $C_K$).

Next, $f_2$ is sent towards cell $C_2$. All satellite terminals in area 4 receive precoding vector $f_2$ and measure its received power from it. The satellite terminals in cell $C_2$ ($ST_{21}$, $ST_{22}$ . . . ) feed back to the gateway 2 the received SNIR ($SNIR_{21}$, $SNIR_{22}$ . . . ). Notice that in the case of full CSI from the selected satellite terminals, the selected terminal in cell $C_1$ receives zero power from $f_2$.

The scheduler at gateway 2 selects the satellite terminal (among $ST_{21}$, $ST_{22}$ . . . ) with best fed back SNIR value in the area of cell $C_2$. Since the information about the channel of the selected user (satellite terminal) is full, the scheduler asks the selected satellite terminal (with best SNIR) to feed back its whole channel (amplitude and phase) $h_{sel(2)}$. $h_{sel(2)}$ is a vector 1×K, each of which elements comprise modulo and phase.

This process is sequentially repeated over all the beams pointing towards the remaining cells $C_3$ $C_4$ . . . $C_K$).

Thus, for the generation of precoding vector $f_3$, a blocking matrix $D_3$ is built as follows:

$$D_3=[b_3 h_{sel(1)}^H h_{sel(2)}^H]$$

wherein $b_3$ is chosen in a similar way as $b_1$ and $b_2$.

And a power normalized transmitting precoding vector $f_3$ is generated by using the blocking matrix as $$f_3=D_3[D_3^H D_3]^{-1}1$$

where 1 is a vector of all zeros except the position that corresponds to the number "p" of a corresponding cell $C_p$ (in this case, p=3). $f_3$ is a normalised vector of K×1.

Like previously, $f_3$ is sent towards cell $C_3$. The satellite terminals in cell $C_3$ ($ST_{31}$, $ST_{32}$ . . . ) feed back to the gateway 2 the received SNIR ($SNIR_{31}$, $SNIR_{32}$ . . . ). Notice that in the case of full CSI from the selected satellite terminals, the selected terminal in cell $C_1$ and that corresponding one in cell $C_2$ receive zero power from $f_3$.

The scheduler at gateway 2 selects the satellite terminal (among $ST_{31}$, $ST_{32}$ . . . ) with best fed back SNIR value in the area of cell $C_3$. The scheduler asks the selected satellite terminal (with best SNIR) to feed back its whole channel (amplitude and phase) $h_{sel(3)}$. $h_{sel(3)}$ is again a vector 1×K.

For the generation of the remaining columns $f_4$ . . . $f_K$, and selection of best satellite terminals within the remaining cells, new blocking matrixes $D_4$ . . . $D_K$ are built in a similar way. Thus, for p=4, 5 . . . K, a matrix $D_p$ takes the form of:

$$D_p=[b_p h_{sel(1)}^H h_{sel(2)}^H \ldots h_{sel(p-1)}^H]$$

having K rows and p columns.

Thus, the selected satellite terminal in the area of cell $C_p$ avoids interference from the sequentially generated precoding vectors after its own precoding vector. In this case, the precoding vector $f_p$ is orthogonal to the channel of the satellite terminal in precoding vectors $f_1$ . . . $f_{p-1}$.

Once matrix $D_p$ is obtained, a power normalized transmitting precoding vector $f_p$ is generated by using the blocking matrix as $$f_p=D_p[D_p^H D_p]^{-1}1$$

where again 1 is a vector of all zeros except the position that corresponds to the number "p" of a corresponding cell $C_p$ (in this case, it is position p). $f_p$ is a normalised vector of K×1.

As can be appreciate, in the case of full CSI from selected users, the interference cancellation to the previously setup precoding vectors, makes the user in $C_1$ avoid receiving interference, while the user in $C_2$ receives interference only from the precoding vector sent towards $C_1$, and it avoids the interference from the other precoding vectors (towards $C_3$ $C_4$ . . . ). The order of precoding is very important in this triangular interference cancellation process.

Thus, a matrix F having K×K is formed.

The multiuser diversity gain is kept in the system because the phase received by each satellite terminal is different and the phase generation in the precoding vector itself is random.

Once matrix F is built and the best users (satellite terminals) selected, a data transmission can start, wherein K users are simultaneously served.

B—Method for Precoding when Partial Channel State Information at Transmitter Side In this case, the generation of precoding vectors $f_1, f_2 \ldots f_K$ is sequentially done. However, they are not transmitted toward the respective cells until the whole matrix F is built. This means that the best satellite terminals are not sequentially selected. On the contrary, the K selected satellite terminals (one per cell) are simultaneously selected once matrix F is built and sent by means of any multiple access scheme. This has the advantage of reducing the time dedicated to the initialisation of the transmission. This is explained next.

Like in situation A, a vector $b_1$ having size K×1 is selected from the SPD. $b_1$ is normalized in power and thus converted into $f_1$.

Next, a second transmitting precoding vector $f_2$ is now required. The objective is to have a precoding vector $f_2$ which interferes as little as possible with precoding vector $f_1$. Again, we start from an initial vector $b_2$. $f_2$ is developed in a similar way as that of precoding vector $f_1$: The SPD received in cell $C_2$ from each one of the K beams is also known, as previously explained. Again, we start from an initial vector $b_2$. Like $b_1$, $b_2$ is a vector having size K×1. The modulo of each of the K elements of this vector $b_2$ is directly taken from the SPD, as already explained, while the phase of each element is randomly generated.

For the design of column $f_2$, a blocking matrix $D_2$ having dimension K×2 is designed. Blocking matrix $D_2$ has a first column corresponding to vector $b_2$ and a second column corresponding to a vector $f_1^H$:

$$D_2 = [b_2 f_1^H]$$

In other words, blocking matrix $D_2$ is based on the information of the radiation pattern of the antennas at the satellite 1.

Once matrix $D_2$ is obtained, a power normalized transmitting precoding vector $f_2$ is generated (but nor transmitted yet) by using the blocking matrix as $$f_2 = D_2 [D_2^H D_2]^{-1} 1$$

where 1 is a vector of all zeros except the position that corresponds to the number "p" of a corresponding cell $C_p$ (in this case, p=2). $f_2$ is a normalised vector of K×1.

$f_2$ is formulated to obtain orthogonal precoding vectors at the transmitter side. Through this approach, the received interference at each serviced satellite terminal is considerably decreased. This blocking matrix $D_2$ guarantees as little interference between $f_1$ and $f_2$ as possible, but it does not achieve absolute interference cancellation.

This process is repeated until K precoding vectors are built.

Thus, for the generation of precoding vector $f_3$, a blocking matrix $D_3$ is built as follows:

$$D_3 = [b_3 f_1^H f_2^H]$$

wherein $b_3$ is chosen in a similar way as $b_1$ and $b_2$.

And a power normalized precoding vector $f_3$ is generated by using the blocking matrix as $$f_3 = D_3 [D_3^H D_3] hu -1 1$$

where 1 is a vector of all zeros except the position that corresponds to the number "p" of a corresponding cell $C_p$ (in this case, p=3). $f_3$ is a normalised vector of K×1.

For the generation of the remaining precoding vectors $f_4 \ldots f_K$ new blocking matrixes $D_4 \ldots D_K$ are built in a similar way. Thus, for p=4, 5 … K, a matrix $D_p$ takes the form of:

$$D_p = [b_p f_1^H f_2^H \ldots f_{p-1}^H]$$

having K rows and p columns.

Once matrix $D_p$ is obtained, a power normalized transmitting precoding vector $f_p$ is generated by using the blocking matrix as $$f_p = D_p [D_p^H D_p]^{-1} 1$$

where again 1 is a vector of all zeros except the position that corresponds to the number "p" of a corresponding cell $C_p$ (in this case, it is position p). $f_p$ is a normalized vector of K×1.

Thus, a precoding matrix F having K×K is formed.

Once precoding matrix F is obtained, a simultaneous transmission over all the beams with the whole precoding matrix F is done.

Next, each one of the plurality of satellite terminals at each cell feeds back to the scheduler of the gateway 2 its received SNIR (signal-to-noise-interference ratio) ($SNIR_{11}$, $SNIR_{12} \ldots SNIR_{21}, SNIR_{22} \ldots SNIR_{K1}, SNIR_{K2} \ldots$). The scheduler at the gateway 2 selects, for each cell, the satellite terminal with best fed back SNIR value.

Next, a data transmission can start, wherein K users (the satellite terminals with best SNIR) are simultaneously served.

In summary, the invention provides a method of assigning a precoding matrix in a broadband satellite system which takes into account the radiation pattern of the satellite antennas, the line of sight channel characteristics and the multiuser diversity caused by all the satellite terminals served by a satellite. Thus, interference is mitigated.

The method of the present invention provides a number of advantages with respect to conventional methods. Some of these advantages are:

higher bitrate;

better availability (less outage), which means that it satisfies the minimum detection requirement rate imposed by the terminals;

less variance of the rates among terminals. This is an important requirement in commercial systems.

In the method of the invention, the channel amplitude (obtained through the SPD) is more important in the precoder generation process. Since all terminals share similar amplitude characteristics within the same beam coverage while the phase is different among them, the method provides very similar rate over all the terminals in each coverage area. Hence, the rate assigned to the terminals over the consecutive time instants shows low variance over the time. This is actually an important feature in the transmitting frames design for its implementation in commercial standards.

In summary, the present invention presents a precoder design that considers the satellite antennas beams radiation pattern in the precoder design process, so that the precoder is generated taking into account the LOS channel characteristics. The precoding is accomplished over all the beams managed by a single gateway where an opportunistic user selection process is performed.

If the method of the invention is compared to that of the prior art: It is remarked that, while the processing disclosed by L. Cottatellucci, et. al. (see the referral in the "State of the Art") takes the channel into consideration, it does not exploit the information of the radiation pattern of the satellite antennas. This prior art disclosure is not aware of the fact that the channel has Line of Sight (LOS), and therefore it does not exploit it. Its scheme is the same as that of communications, without specific considerations to satellite systems. Furthermore, Cottatellucci's precoding scheme requires for full channel information. However, full channel information for all the users is impracticable. As a consequence, a random user selection is carried out. Therefore, all the multiuser gain is wasted.

The invention is obviously not limited to the specific embodiments described herein, but also encompasses any variations that may be considered by any person skilled in the art (for example, as regards the choice of components, configuration, etc.), within the general scope of the invention.

The invention claimed is:

1. A method of providing a signal in a broadband satellite system,
the broadband satellite system comprising
a satellite, a gateway, and a plurality of users located in a geographic area, the satellite for receiving and re-transmitting a plurality of satellite beams, the satellite comprising a plurality of antennas, each beam comprising a plurality of channels,
wherein there are fewer satellite beams than users and the number of satellite beams is K;
the method comprising the steps of:
(a) determining by the gateway or by the satellite a transmitting radiation pattern of the plurality of satellite antennas;
(b) determining by the gateway or by the satellite a line of sight channel characteristic;
(c) determining by the gateway or by the satellite a multiuser diversity by selecting a first group of users from the plurality of users, the first group of users having a predetermined signal-to-noise ratio or a predetermined signal-to-noise-interference-ratio, the first group of users being smaller than the plurality of users;
(d) assigning by the gateway or by the satellite a precoding beam forming scheme comprising the transmitting radiation pattern, the line of sight characteristic for each channel, and the first group of users;
(e) applying by the gateway or by the satellite the precoding beam forming scheme to the broadband satellite system regardless if the broadband satellite system has full channel knowledge or partial channel knowledge of the plurality of users; and
(f) transmitting the plurality of satellite beams toward the plurality of users by the gateway via the satellite.

2. The method of claim 1, wherein step (c) is performed by dividing the geographic area into a plurality of cells, each cell comprising at least one user, and
selecting a first user in each cell having a highest signal-to-noise ratio or a highest signal-to-noise-interference-ratio in the respective cell.

3. The method of claim 2, wherein step (d) is performed by
(d1) generating a first precoding vector and transmitting it towards a first cell from the satellite,
wherein the first precoding vector is responsive to the radiation pattern, and
wherein the first precoding vector is a vector of the first user of the first cell and the precoding vector comprises a contribution of each of the satellite beams over the first cell;
(d2) feeding back to the satellite of a signal-to-noise ratio of the first cell or a signal-to-noise-interference-ratio of the first cell measured by each user in the first cell;
(d3) selecting by the satellite a preferred user within the first cell having a highest signal-to-noise ratio or a highest signal-to-noise-interference-ratio;
(d4) requesting the preferred user to send the line of sight channel characteristic;
repeating steps (d1), (d2), (d3), (d4) for a plurality of subsequent precoding vectors in other cells for users located in the respective cell; and
generating a precoding matrix having a size of K×K, wherein each row is one of the plurality of users and each column comprises the precoding vector associated with the one of the plurality of users.

4. The method of claim 3,
wherein the first precoding vector comprises normalizing in power a first vector which comprises K power contributions corresponding to said satellite beams towards the first cell, and
wherein the subsequent plurality of precoding vectors comprises normalizing in power a corresponding vector which comprises K power contributions corresponding to K satellite beams towards a respective cell.

5. The method of claim 3, wherein each of the subsequent plurality of precoding vectors is dependent on a blocking matrix $D_p$ having size K×p, where the number of precoding vectors is p, the matrix being formed by $$D_p = [b_p h_{sel(1)}^H h_{sel(2)}^H \ldots h_{sel(p-1)}^H]$$

wherein $b_p$ is a corresponding vector, and wherein $h_{sel(1)}$ $h_{sel(2)} \ldots h_{sel(p-1)}$ are channel characteristics of the previously selected satellite terminals.

6. The method of claim 5, wherein each vector of the subsequent plurality of precoding vector $f_p$ is formed as follows $$f_p = D_p [D_p^H D_p]^{-1} 1$$

where 1 is a vector of all zeros except the position that corresponds to the number p of said cell ($C_p$) and $f_p$ is a normalized vector of K×1.

7. The method of claim 3, wherein the line of sight channel characteristic comprises both amplitude and phase information.

8. The method of claim 2, further comprising
generating the first precoding vector ($f_1$) responsive to the radiation pattern, the precoding vector ($f_1$) being a vector K×1 and said precoding vector ($f_1$) comprising the contribution of each of said K beams over said first cell ($C_1$);
generating K−1 subsequent precoding vectors ($f_2, f_3, \ldots f_K$), each of them having size K×1, each subsequent precoding vector ($f_p$) being dependent on the information of the radiation pattern of said satellite antennas and on the precoding vector previously built ($f_1, f_2, \ldots f_{p-1}$) and said precoding vector ($f_p$) comprising the contribution of each of said K beams over a corresponding cell ($C_r$); and
generating a precoding matrix (F) having size K×K, wherein the K columns of said precoding matrix (F) are the K precoding vectors ($f_1, f_2, \ldots f_K$) previously built.

9. The method of claim 8, wherein each of the subsequent plurality of precoding vectors is dependent on a blocking matrix Dp having size K×p, where the number of precoding vectors is p, the matrix being formed by $$D_p = [b_p f_1^H f_2^H \ldots f_{p-1}^H]$$

wherein $b_p$ is a corresponding vector.

10. The method of claim 9, wherein each vector of the subsequent plurality of precoding vector $f_p$ is formed as follows $$f_p = D_p [D_p^H D_p]^{-1} 1$$

where 1 is a vector of all zeros except the position that corresponds to the number p of said cell ($C_p$) and $f_p$ is a normalized vector of K×1.

11. The method of claim 2, further comprising
transmitting a precoding matrix towards the geographic area;
feeding back to the satellite from each cell a signal-to-noise ratio or a signal-to-noise-interference-ratio of each cell measured by each user in the respective cell; and
selecting by the satellite a preferred user within each respective cell having a highest signal-to-noise ratio or a highest signal-to-noise-interference-ratio.

* * * * *